(12) United States Patent
Lin

(10) Patent No.: US 10,474,015 B1
(45) Date of Patent: Nov. 12, 2019

(54) STRUCTURE OF PROJECTION LIGHT STRING

(71) Applicant: Chia-Hua Lin, New Taipei (TW)

(72) Inventor: Chia-Hua Lin, New Taipei (TW)

( * ) Notice: Subject to any disclaimer, the term of this patent is extended or adjusted under 35 U.S.C. 154(b) by 0 days.

(21) Appl. No.: 16/124,602

(22) Filed: Sep. 7, 2018

(51) Int. Cl.
| | |
|---|---|
| *G03B 21/20* | (2006.01) |
| *G03B 21/14* | (2006.01) |
| *F21S 4/10* | (2016.01) |
| *G03B 29/00* | (2006.01) |
| *H05B 37/02* | (2006.01) |
| *F21V 23/02* | (2006.01) |
| *G02B 27/09* | (2006.01) |
| *F21S 8/00* | (2006.01) |
| *F21S 4/00* | (2016.01) |

(52) U.S. Cl.
CPC ............. *G03B 21/145* (2013.01); *F21S 4/00* (2013.01); *F21S 4/10* (2016.01); *F21S 8/035* (2013.01); *F21V 23/023* (2013.01); *G02B 27/0955* (2013.01); *G03B 21/2013* (2013.01); *G03B 21/2033* (2013.01); *G03B 29/00* (2013.01); *H05B 37/0218* (2013.01)

(58) Field of Classification Search
CPC ...... F21S 4/10; F21S 4/00; F21S 8/035; F21S 23/04; F21V 23/023; G02B 27/0955; G03B 21/145; G03B 21/2013; G03B 21/2033; G03B 29/00; H05B 37/0218
See application file for complete search history.

(56) References Cited

U.S. PATENT DOCUMENTS

| | | | | |
|---|---|---|---|---|
| 7,227,120 | B2* | 6/2007 | Shimokawa | G01V 8/20 250/214 R |
| 10,156,777 | B1* | 12/2018 | Altamura | G03B 21/001 |
| 2006/0186341 | A1* | 8/2006 | Ueno | G01T 1/2985 250/363.05 |
| 2010/0214541 | A1* | 8/2010 | Chien | H04N 5/2354 353/119 |
| 2017/0329211 | A1* | 11/2017 | Chien | G01V 8/20 |

* cited by examiner

*Primary Examiner* — Cara E Rakowski
*Assistant Examiner* — Magda Cruz
(74) *Attorney, Agent, or Firm* — WPAT, PC

(57) ABSTRACT

A structure of projection light string is disclosed, comprising a power plug body, a light string power line, an electronic device and multiple projection devices installed in suspension over the light string power line, wherein the electronic circuit device is electrically connected to the power plug body and the light string power line, and further electrically connected to the projection devices by way of the power circuit within the light string power line; in addition, the inside of the projection device includes a projector capable of projecting images toward outside and a controller electrically connected to the projector, so that, after the electronic circuit device having transferred at least a projection time parameter and at least a projection mode parameter to the controller of each projection device, the controller can control the projection operations of the projector in accordance with the received projection time parameter and projection mode parameter.

10 Claims, 12 Drawing Sheets

STRUCTURE OF PROJECTION LIGHT STRING

BACKGROUND OF THE INVENTION

1. Field of the Invention

The present invention generally relates to a structure of projection light string; in particular, it relates to a structure of projection light string capable of controlling different projection devices to project images by turns or simultaneously thereby allowing the observer to perceive the effect of continuous dynamic images because of visual persistence.

2. Description of Related Art

During Christmas days, it is customary to wrap a Christmas light string on a Christmas tree, house or other decorations in order to increase festival atmosphere with colorful Christmas lights. However, due to structural limitations, Christmas light strings are restricted by different color bodies, shapes, lighting methods of these light bulbs or else other possible factors, thus limiting the entertainment effects of this type of strings.

Moreover, most of currently available projection devices only enable projections of single images, whose internal configurations usually include various elements such as a set of illumination components, projection image films and lenses etc., and project the images of the placed projection films onto an assigned position by means of the illumination components through these lenses. As such, integrally speaking, single images presented at a single angle may be not only tedious, but also non-variant.

Hence, it would be an optimal solution for the aforementioned issues if it is possible to combine the concepts with respect to light strings and projection devices, designing the projection device as a serial type of objects along with electrical connections of an electronic circuit device, thereby simultaneously controlling a plurality of projection devices to take turns for images projections such that an observer can perceive the effect of continuous dynamic images because of visual persistence.

SUMMARY OF THE INVENTION

The present invention provides a structure of projection light string, comprising: a power plug body, electrically connected to an AC (alternative current) input power for providing AC power; a light string power line, internally including multiple lines for transferring electric power and control signals; multiple projection devices, electrically connected in suspension over the light string power line, and internally including at least a projector capable of projecting images toward outside and a controller electrically connected to the projector, in which the controller is installed so as to control the activation and deactivation of the projector; an electronic circuit device, connected to the power plug body and the light string power line, and capable of electrically connecting to the controller within the multiple projection devices by way of the light string power line, in which the electronic circuit device includes: a system controller, used to control the integral operations of the electronic circuit device; a power convertor, electrically connected to the power plug body in order to convert the AC power provided by the power plug body into DC (direct current) power; a stabilizer, electrically connected to the system controller and the power convertor and used to, after having performed voltage stabilization on the DC power converted and provided by the power convertor, output electric power to the system controller and each of the projection devices; a function selection button, electrically connected to the system controller and allowed to be pressed in order to return at least a projection mode parameter to the system controller, in which such returned projection mode parameters are utilized to control the projection mode parameters of the at least one or more projection devices; a time selection button, electrically connected to the system controller and allowed to be pressed in order to return at least a projection time parameter to the system controller, in which such returned projection time parameters are utilized to control the projection time of the at least one or more projection devices; and a control signal output buffer, electrically connected to the system controller and each of the projection devices and used to transfer the projection time parameter and the projection mode parameter to each projection device by means of signals, thereby controlling the projection time and projection mode of the projection device for projecting images toward outside.

In a preferred embodiment, the projection device includes a housing which has an opening toward outside, and the opening of the housing is combined with a lid body having a light exit hole, while one end of the projector is engaged with the light exit hole of the lid body.

In a preferred embodiment, the projector in the projection device is sequentially toward outside installed with a projection light, a first lens, a projection film and a second lens, in which the second lens is close to the light exit hole.

In a preferred embodiment, the control signal output buffer is used to boost the output power thereby increasing the transfer distance of the control signals.

In a preferred embodiment, the system controller is electrically connected to a photo sensor which is applied to sense the ambient brightness condition around the electronic circuit device and returns the detection results to the system controller, and then the system controller determines whether the surrounding area of the electronic circuit device is currently at daytime or nighttime based on the received detection results.

In a preferred embodiment, the system controller is electrically connected to a wireless transmitter which is used to receive or transfer the projection time parameter and/or the projection mode parameter via wireless transmissions.

In a preferred embodiment, the wireless transmitter is a WIFI signal controller.

In a preferred embodiment, the wireless transmitter is a RF signal controller.

In a preferred embodiment, the light string power line is further connected to at least an illuminating lamp which is electrically connected to the electronic circuit device and whose ON/OFF status is under the control of the electronic circuit device.

In a preferred embodiment, the electronic circuit device further includes a status displayer electrically connected to the system controller and used to show the contents represented upon pressing down the function selection button or the time selection button.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
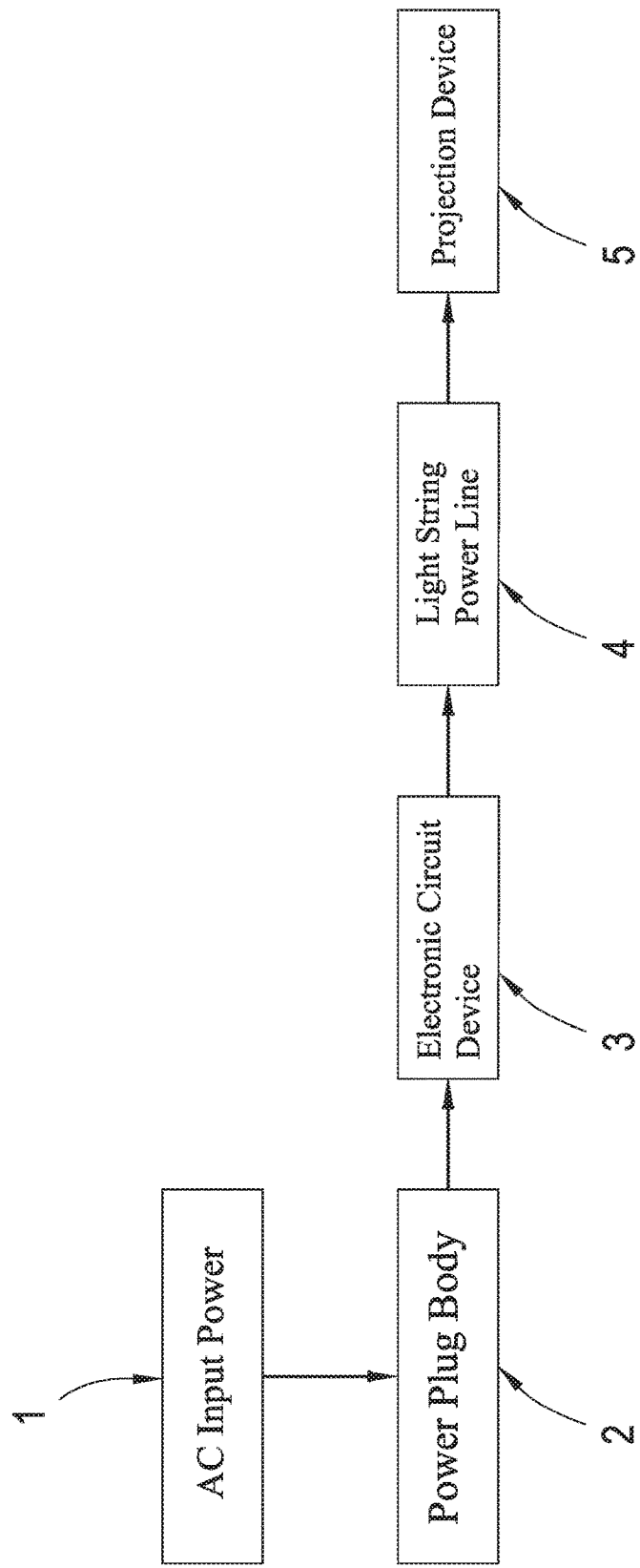
FIG. 1 shows an overall architecture diagram for the structure of projection light string according to the present invention.
Figure 2:
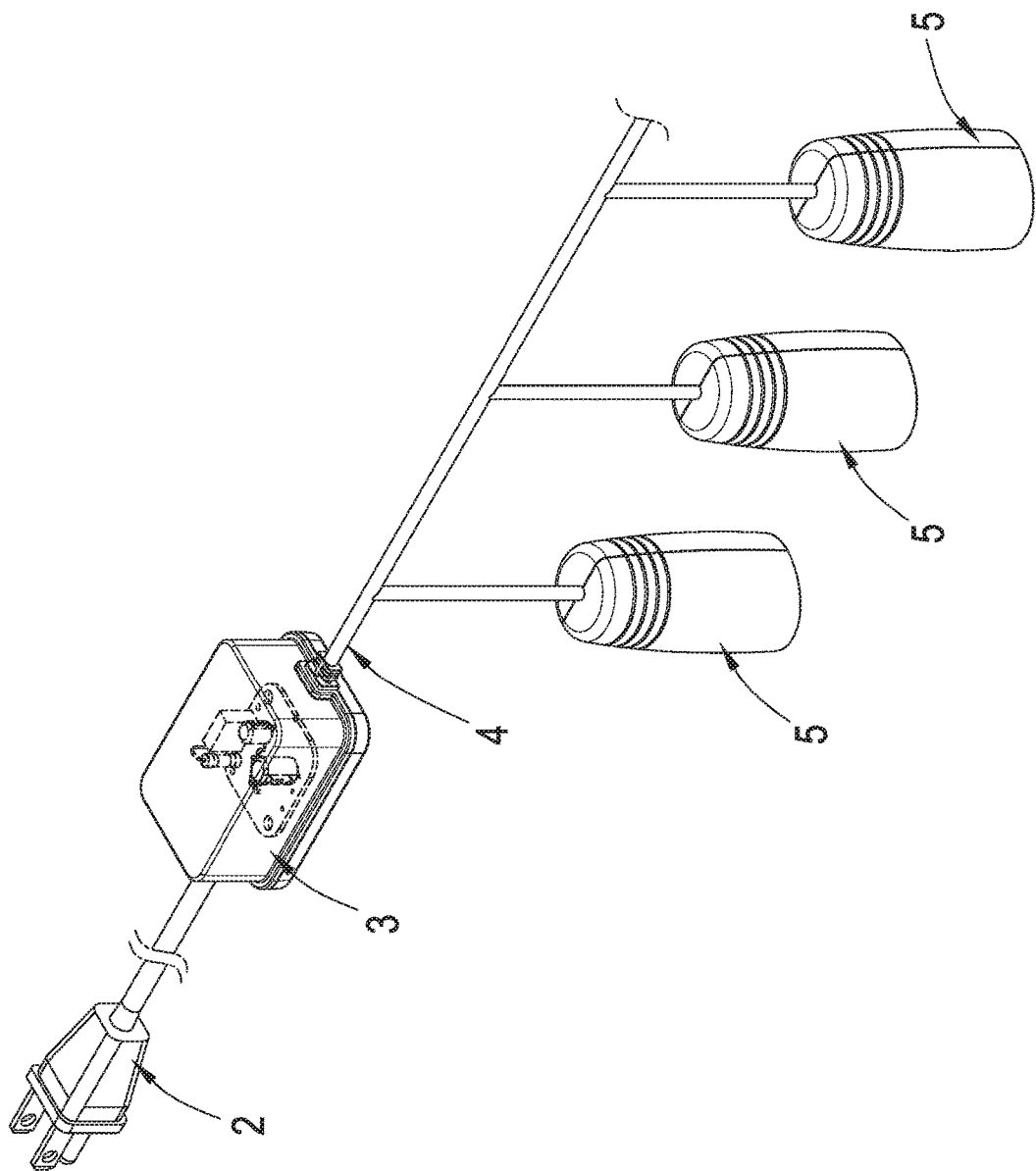
FIG. 2 shows an implementation structure diagram for the structure of projection light string according to the present invention.

Refer now to FIGS. 1 and 2, wherein an overall architecture diagram as well as an implementation structure diagram for the structure of projection light string according to the present invention are respectively shown. As shown in the Figures, the disclosed structure of projection light string comprises a power plug body 2, an electronic circuit device 3, a lights string power line 4 and at least a projection device 5, in which the power plug body 2 is electrically connected to an alternative current (AC) input power 1 for inputting AC power, while the light string power line 4 internally includes multiple cables for feeding electric power and signals.

Figure 3A:
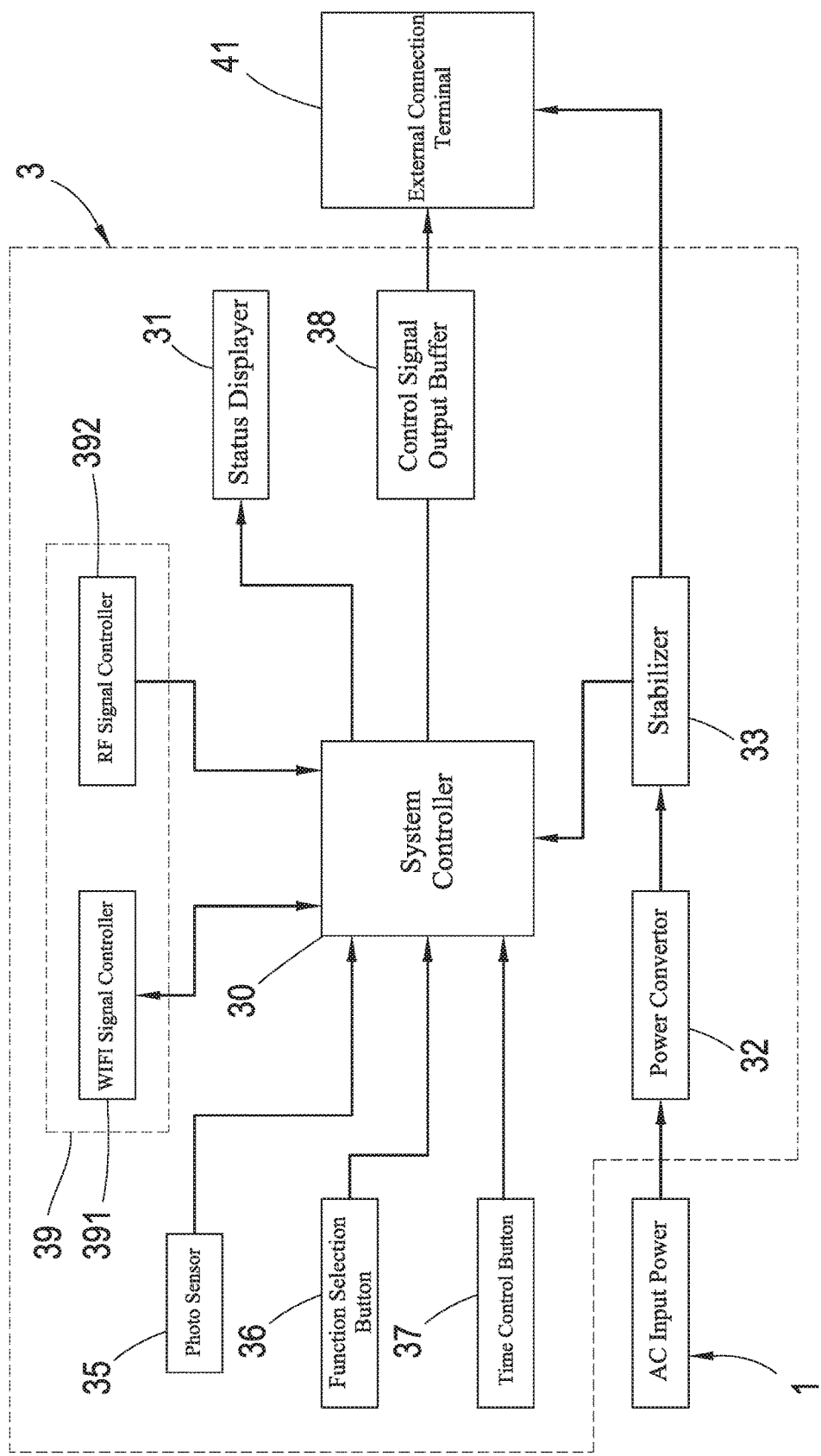
FIG. 3A shows an architecture diagram of the electronic circuit device in the structure of projection light string according to the present invention.
Figure 3B:
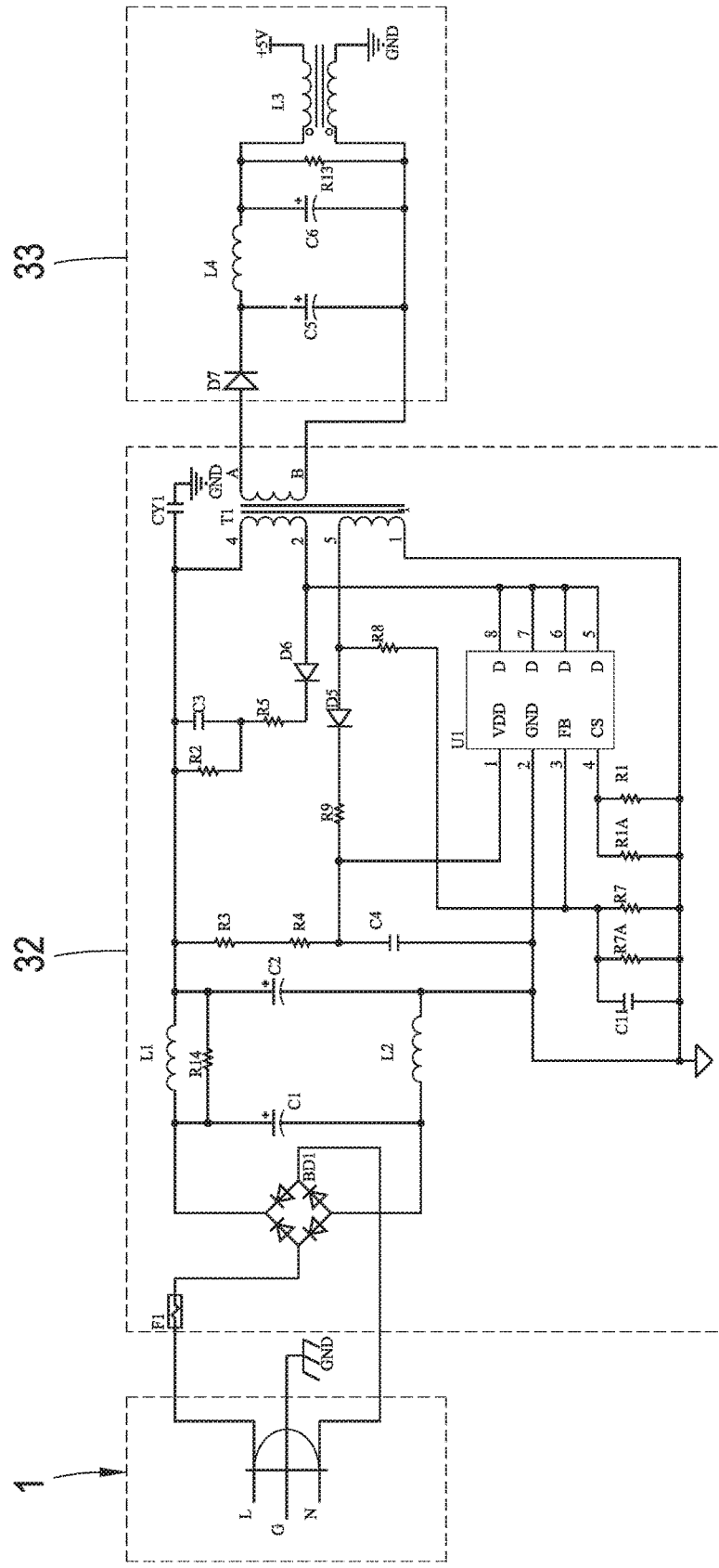
FIG. 3B shows an electronic circuit architecture diagram of the electronic circuit device in the structure of projection light string according to the present invention.
Figure 3C:
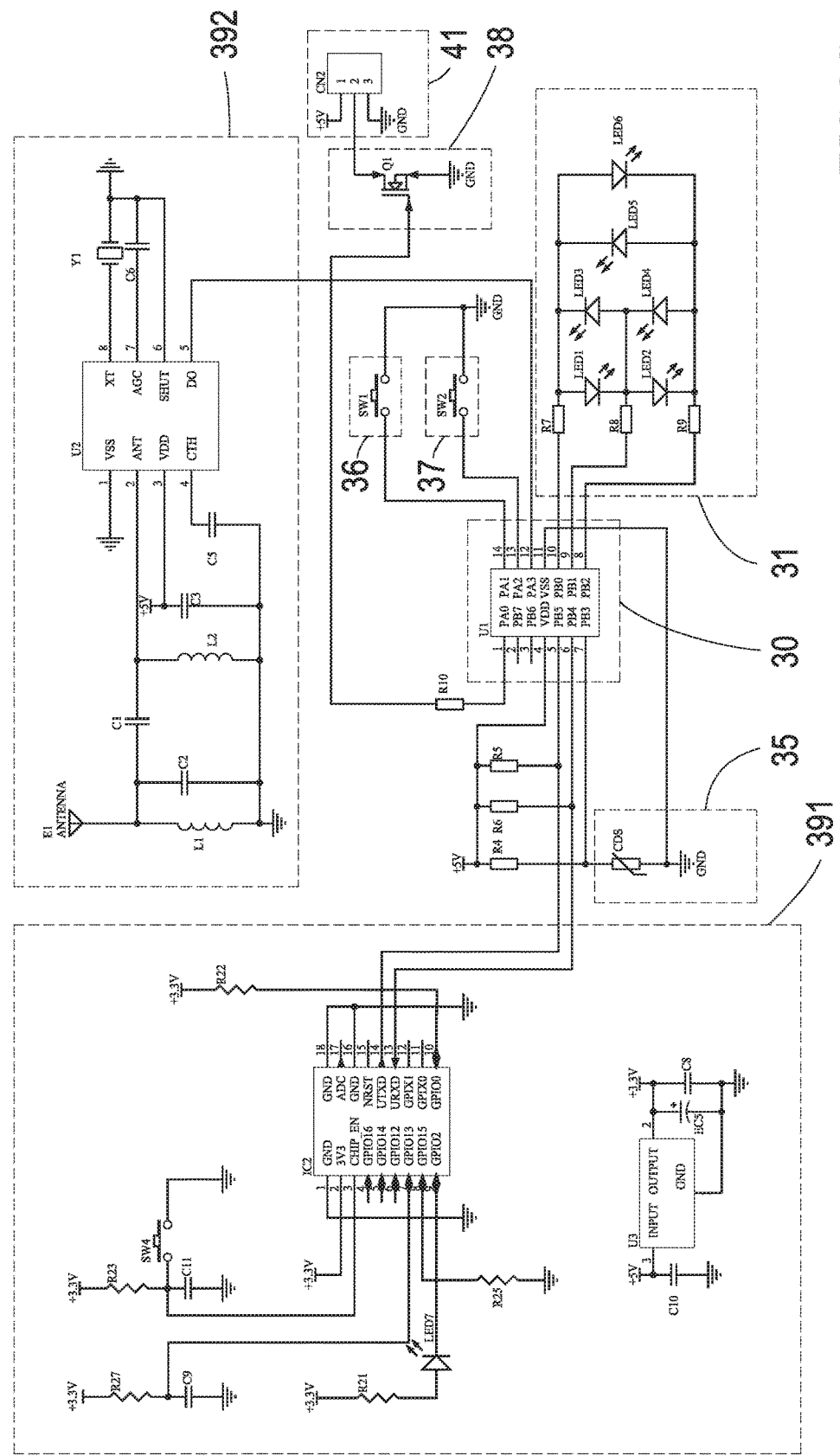
FIG. 3C shows an electronic circuit architecture diagram of the electronic circuit device in the structure of projection light string according to the present invention.

Herein the electronic circuit device 3 is electrically connected to the power plug body 2 and the light string power line 4, and is also further electrically connected to the controller 51 within such multiple projection devices 5 via the light string power line 4. In addition, FIGS. 3A-3C show the architecture diagram and the electronic circuit diagram of the electronic circuit device 3, which comprise a system controller 30, a status displayer 31, a power convertor 32, a stabilizer 33, a photo sensor 35, at least a function selection button 36, at least a time selection button 37, a control signal output buffer 38 as well as a wireless transmitter 39.

Herein the controller 30 controls the overall operations of the electronic circuit device 3, the power convertor 32 converts the AC power fed by the AC input power 1 through the power plug body 2 into direct current (DC) power, and the stabilizer 33 performs voltage stabilizations on the DC power outputted from the power convertor 32, and then provides the stabilized power to each of the projection devices 5.

Also, the photo sensor 35 senses the brightness condition in the surrounding area of the electronic circuit device 3 and returns the detection results back to the system controller 30, in which the photo sensor 35 sends the detection results to the system controller 30 and, after receiving these results, the system controller 30 then determines whether it is now daytime or nighttime in that area around the electronic circuit device 3 according to the obtained detection results.

Moreover, the function selection button 36 is allowed to be pressed down so as to return at least a projection mode parameter to the system controller 30, and the returned projection mode parameter can be applied to control the projection mode parameter in the at least one or more projection devices 5; similarly, the time selection button 37 can be pressed down so as to return at least a projection time parameter to the system controller 30, and the returned projection time parameter can be applied to control the projection time in the at least one or more projection devices 5.

Furthermore, the control signal output buffer 38 transfers the above-said projection time parameter and the projection mode parameter to each of the projection devices 5 by means of signals thereby controlling the projection time and projection mode of the projection device 5 for projecting images toward outside; besides, the control signal output buffer 38 can also further boost the output power in order to extend the transfer distance of the control signals.

Besides, the wireless transmitter 39 performs receptions or transmissions of such projection time parameters and/or projection mode parameters through wireless transmissions, and may be a WIFI signal controller 391 and/or a RF signal controller 392, thus respectively operating in WIFI or RF wireless transmissions for signal receptions or transmissions.

Figure 4A:
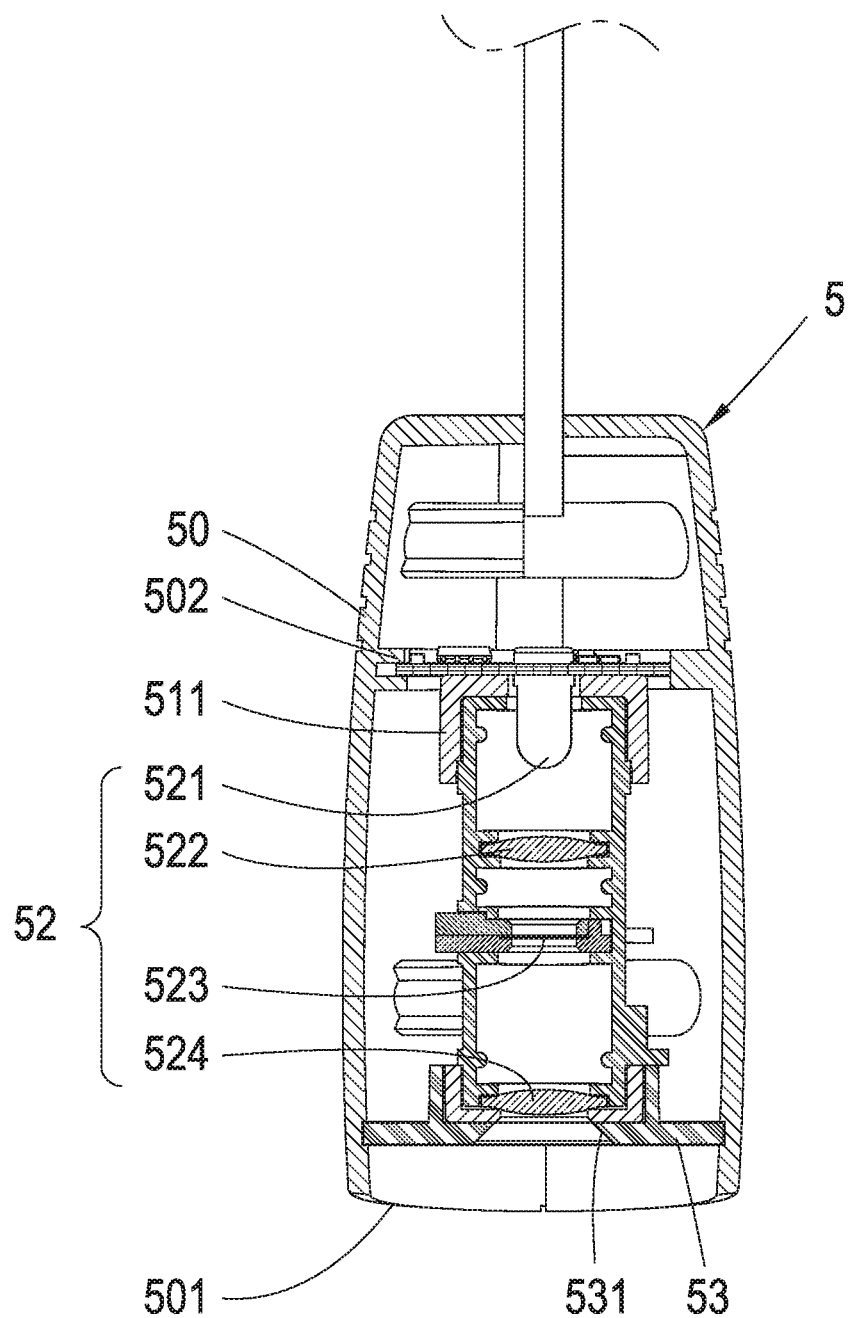
FIG. 4A shows a cross-sectioned structure diagram of the projection device in the structure of projection light string according to the present invention.
Figure 4B:
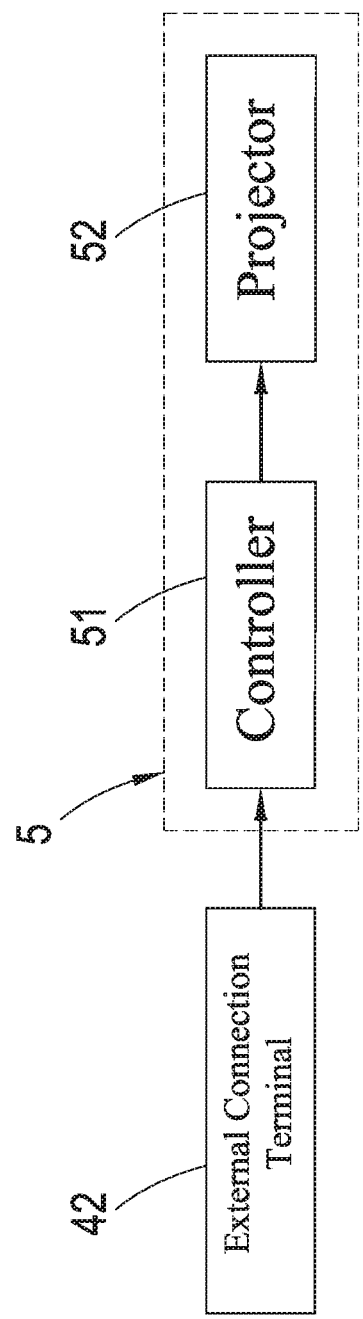
FIG. 4B shows an architecture diagram of the projection device in the structure of projection light string according to the present invention.
Figure 4C:
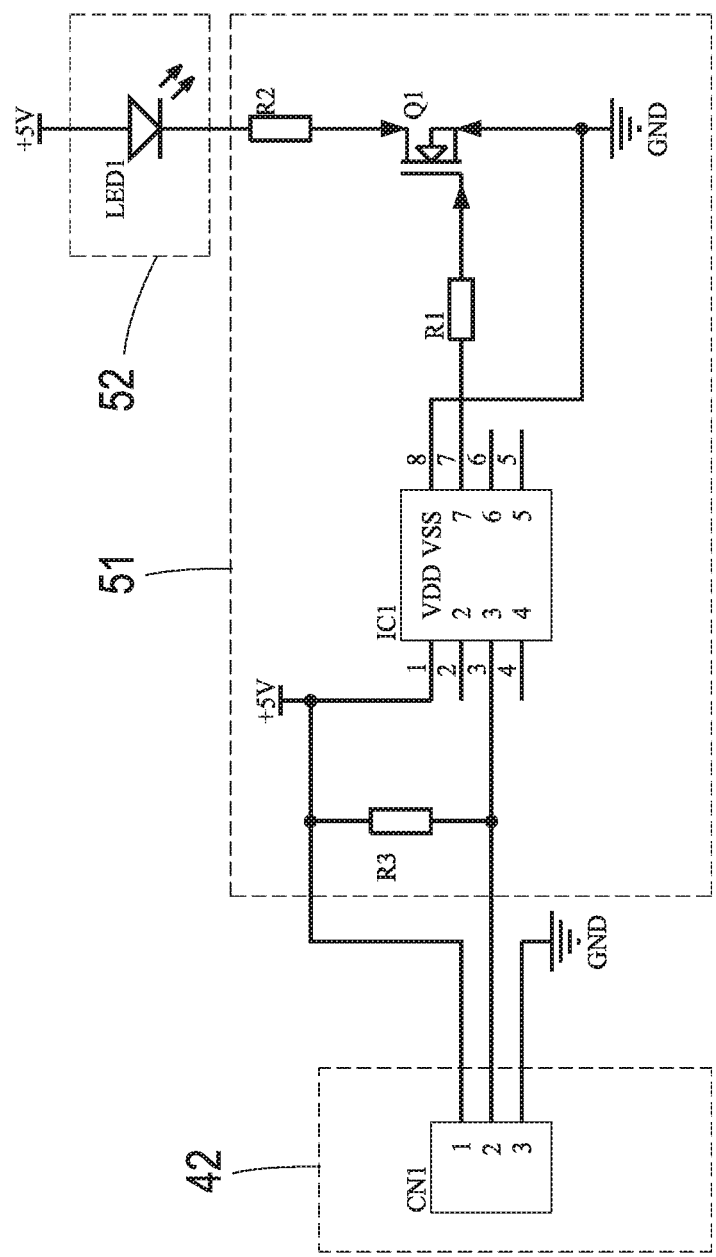
FIG. 4C shows an electronic circuit architecture diagram of the projection device in the structure of projection light string according to the present invention.

Meanwhile, the projection devices 5 are installed in suspension over the electrically connected light string power line 4 such that the projection devices 5 and the light string power line 4 are in a mutually vertical configuration, whose cross-sectioned structure diagram, architecture diagram and electronic circuit diagram are respectively shown in FIGS. 4A-4C, in which each projection device 5 includes a housing 50, an opening 501 is configured at the front end of the housing 50, and a combination seat 502 is also set up on the inner wall face of the housing 50.

Herein the controller 51 (e.g., an electronic circuit board) is assembled on the combination seat 502, a light seat 511 is installed on the controller 51, and at least a projector 52 is set up on the light seat 511 facing toward the opening 501; in addition, the projector 52 is sequentially toward outside installed with a projection light 521, a first lens 522, a projection film 523 and a second lens 524, in which the projection light 521 emits scattered light to the first lens 522 which refracts incident light to the projection film 523, further allowing the image on the projection film 523 to be projected onto the second lens 524, travelling through the second lens 524 and thus finally being projected onto a specified location.

Additionally, a lid body 53 having a light exit hole 531 is combined with the projection device 5 at the opening 501, and the second lens 524 of the projector 52 faces toward the light exit hole 531 of the lid body 53 and projects outwards the image onto the specified location, while the controller 51 controls the activation and deactivation of the projector 52 in accordance with the transferred projection time parameter and the projection mode parameter.

Furthermore, it can be appreciated from FIGS. 3C and 4C that the external connection terminals 41, 42 of the electronic circuit device 3 and the projection device 5 can be connected to the power line within the light string power line 4 such that the electronic circuit device 3 can be electrically connected to the controller 51 of the projection device 5, thus allowing the controller 51 to further control the illumination mechanism in the projector 521. However, in addition to this implementation approach, alternatively a direct connection line can be welded between the electronic circuit device 3 and the projection device 5, rather than using such external connection terminals 41 and 42, for intended conductive engagements.

Figure 5A:
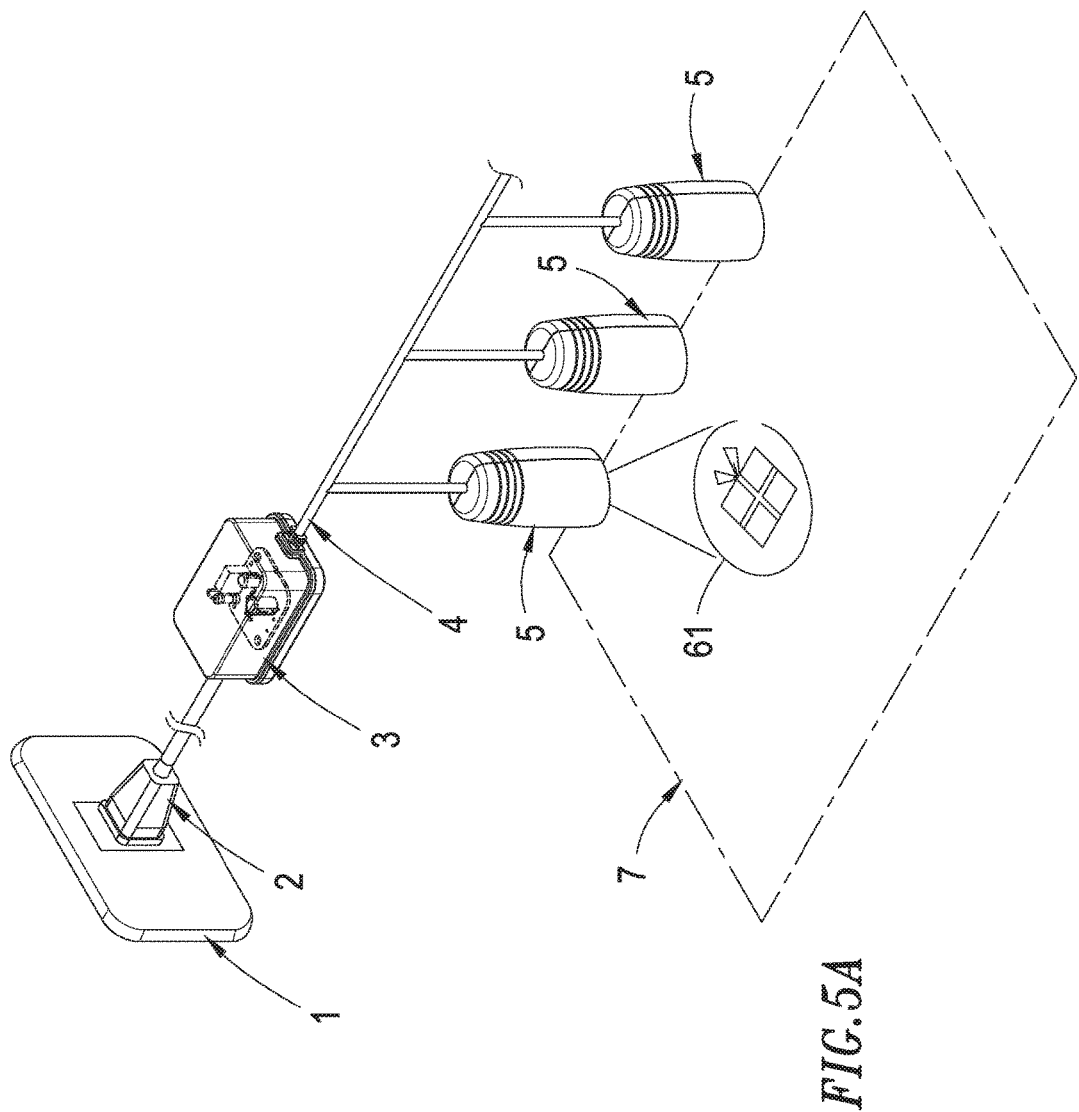
FIG. 5A shows an implemented operation diagram for the structure of projection light string according to the present invention.
Figure 5B:
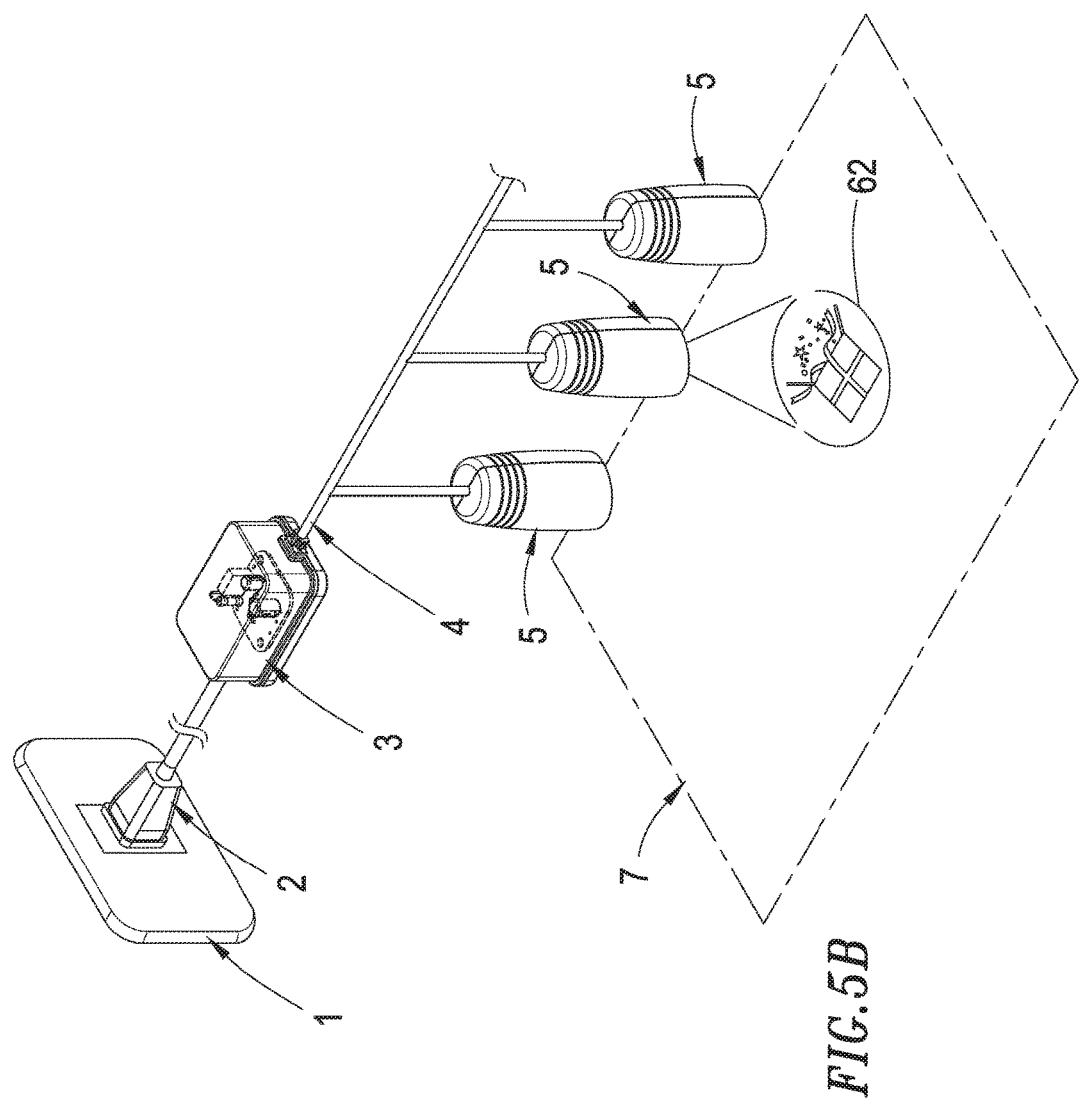
FIG. 5B shows an implemented operation diagram for the structure of projection light string according to the present invention.
Figure 5C:
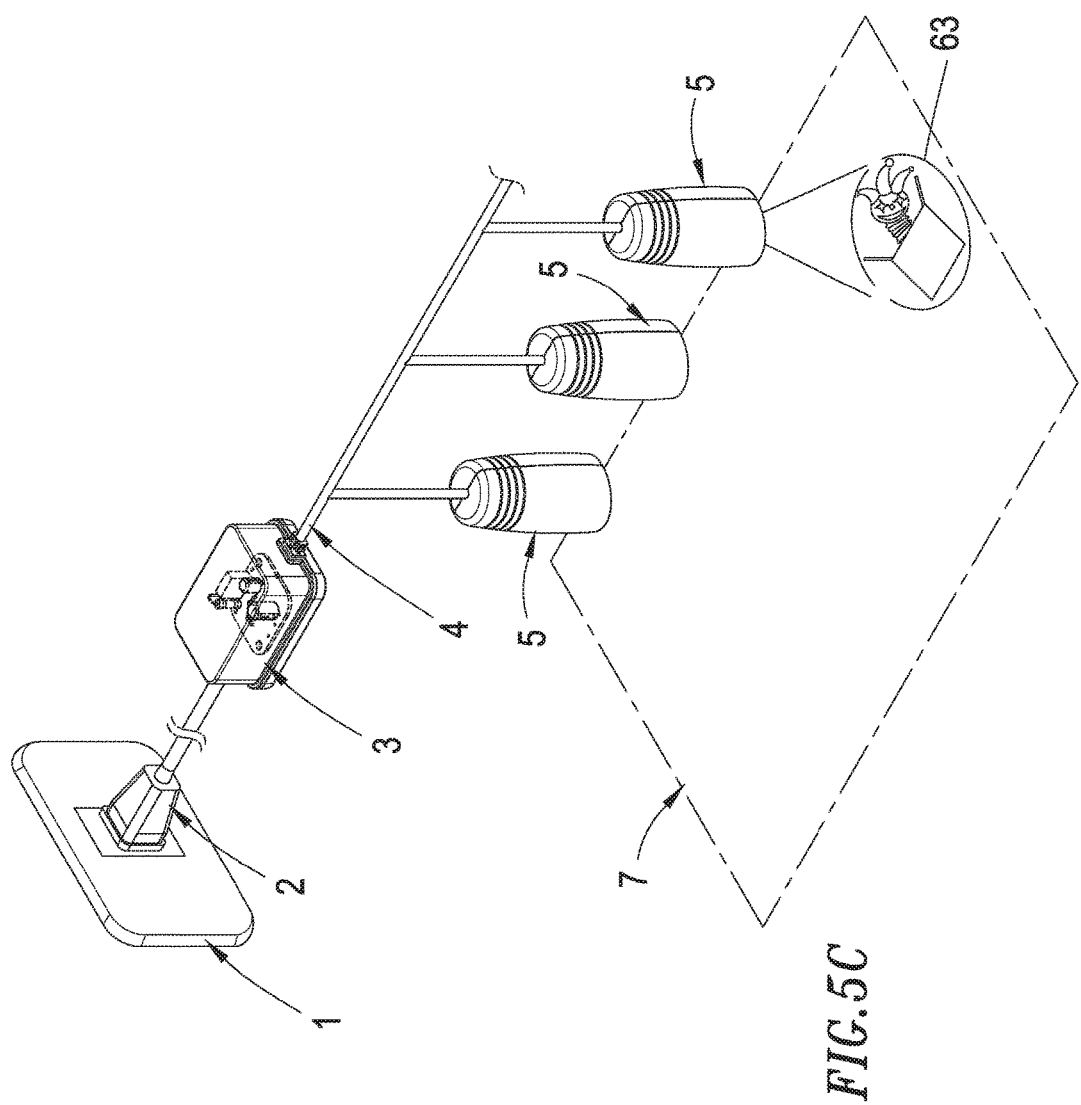
FIG. 5C shows an implemented operation diagram for the structure of projection light string according to the present invention.

After electrically connecting the power plug body 2 to the AC input power 1, the present embodiment is configured to control each projection device 5 to illuminate and project images every a certain duration of time, e.g., upon sending the signal to all of the projection devices 5 at the same time, in which exemplarily the lighting activation time of a first projection device 5 is after 10 seconds (and a continuous lighting time of 20 seconds), the lighting activation time of a second projection device 5 is after 30 seconds (and a continuous lighting time of 20 seconds), and then the lighting activation time of a third projection device 5 is after 50 seconds (and a continuous lighting time of 20 seconds as well). Therefore, as shown in FIGS. 5A-5C, the first projection device 5 projects outwards the image 61 onto the ground 7; then, the first projection device 5 is shut down, and the second projection device 5 subsequently projects outwards the image 62 onto the ground 7; after this, the first and second projection devices 5 are both deactivated, while the third projection device 5 subsequently projects outwards the image 63 onto the ground 7; in this way, these three different images can be sequentially projected on the ground 7 thereby achieving the desired effect of continuous dynamic images.

Because the electronic circuit device 3 can be electrically connected to the controller 51 in each of the projection devices 5, it can control the projection mechanism in all of the projection devices 5. Accordingly, as illustrated in the previous embodiment, the activation time or other settings of different projection devices 5 can be configured in order to achieve continuous or non-continuous illuminations for image projections in different projection devices 5. In addition, it is further possible to activate two or more projection devices 5 to illuminate at the same or different time to project images thereby providing different dynamic image projection effects.

Figure 6:
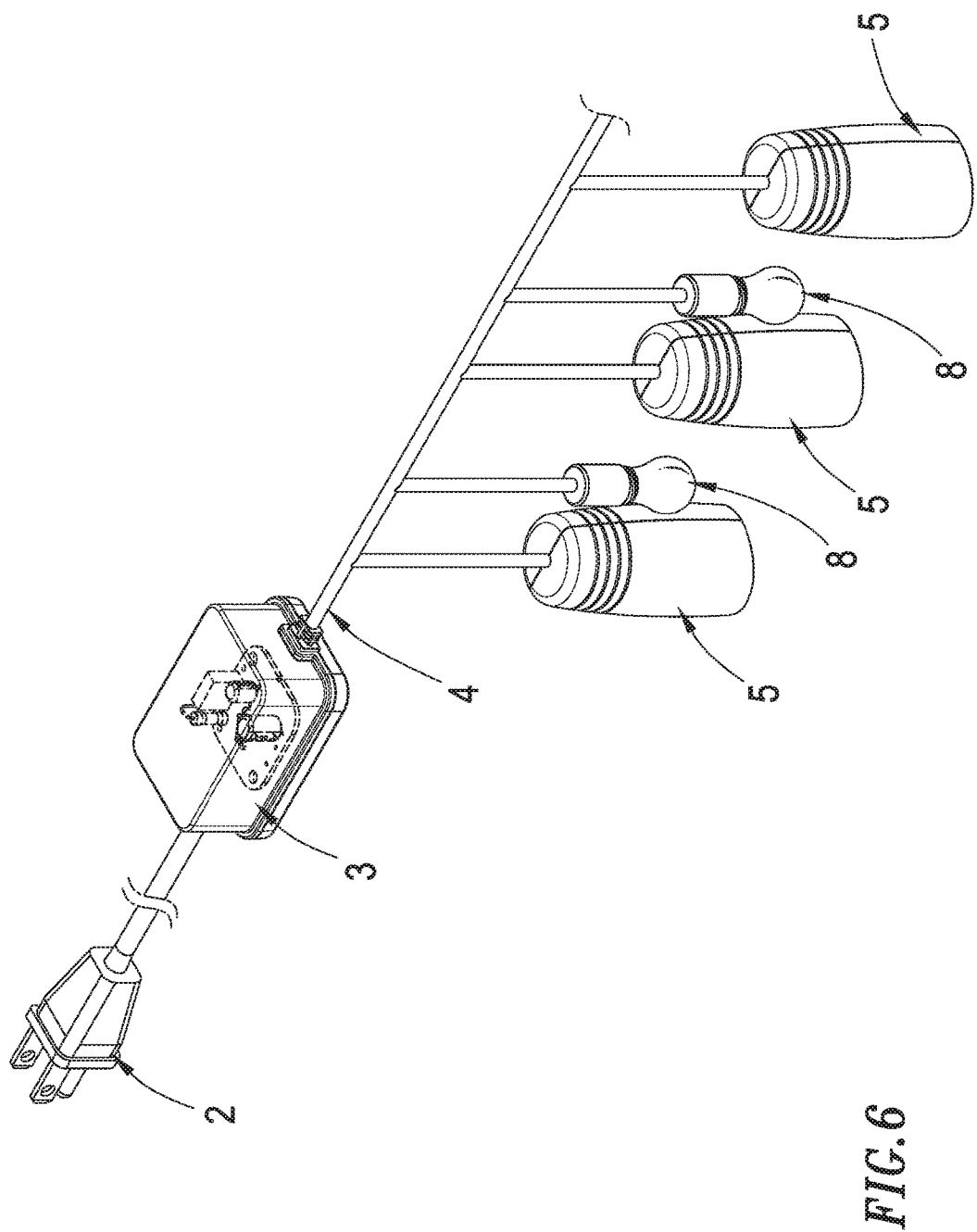
FIG. 6 shows another implementation structure diagram for the structure of projection light string according to the present invention.

Besides, as shown in FIG. 6, the light string power line 4 is further connected with at least an illuminating lamp 8 which is electrically connected to the electronic circuit device 3, and the electronic circuit device 3 controls the ON/OFF status of the illuminating lamp 8 so that the illuminating lamp 8 can be utilized for nighttime outdoor lighting purpose, and a user may choose to let it illuminate and project images simultaneously, or illuminate but not project images, or alternatively, project images but not illuminate.

In comparison with other conventional technologies, the structure of projection light string according to the present invention provides the following advantages:

(1) the present invention combines the concepts of light strings and projection devices and configures the projection devices in a serial connection type, also in conjunction with electrical connections of an electronic circuit device, so as to control multiple projection devices to project images in turn or simultaneously;

(2) the present invention allows to replace different projection films, so it is possible to let multiple projection devices project images by turns or at the same time in order to display different image contents, such that the observer can perceive the effect of continuous dynamic images because of visual persistence.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A structure of projection light string, comprising:
   a power plug body, electrically connected to an AC (alternative current) input power for providing AC power;
   a light string power line, internally including multiple lines for transferring electric power and control signals;
   multiple projection devices, electrically connected in suspension over the light string power line, and internally including at least a projector capable of projecting images toward outside and a controller electrically connected to the projector, in which the controller is installed so as to control the activation and deactivation of the projector;
   an electronic circuit device, connected to the power plug body and the light string power line, and capable of electrically connecting to the controller within the multiple projection devices by way of the light string power line, in which the electronic circuit device includes:
   a system controller, used to control the integral operations of the electronic circuit device;
   a power convertor, electrically connected to the power plug body in order to convert the AC power provided by the power plug body into DC (direct current) power;
   a stabilizer, electrically connected to the system controller and the power convertor and used to, after having performed voltage stabilization on the DC power converted and provided by the power convertor, output electric power to the system controller and each of the projection devices;
   a function selection button, electrically connected to the system controller and allowed to be pressed in order to return at least a projection mode parameter to the system controller, in which such returned projection mode parameters are utilized to control the projection mode parameters of the at least one or more projection devices;
   a time selection button, electrically connected to the system controller and allowed to be pressed in order to return at least a projection time parameter to the system controller, in which such returned projection time parameters are utilized to control the projection time of the at least one or more projection devices;
   a control signal output buffer, electrically connected to the system controller and each of the projection devices and used to transfer the projection time parameter and the projection mode parameter to each projection device by means of signals, thereby controlling the projection time and projection mode of the projection device for projecting images toward outside.

2. The structure of projection light string according to claim 1, wherein the projection device includes a housing whose front side has an opening, and the opening is combined with a lid body on which a light exit hole is configured, and a combination seat is set up on the inner wall face of the housing, and one end of the projector is engaged with the light exit hole of the lid body.

3. The structure of projection light string according to claim 1, wherein the controller of the projection device is assembled onto the combination seat, a light seat is installed on the controller and includes a projector toward the light exit hole, in which the projector is sequentially toward outside installed with a projection light, a first lens, a projection film and a second lens, and the projection light emits scattered light to the first lens which refracts incident light to the projection film, further allowing the image on the projection film to be projected onto the second lens, travelling through the second lens and the light exit hole thus finally arriving and being projected onto a specified location.

4. The structure of projection light string according to claim 1, wherein the control signal output buffer is used to boost the output power thereby increasing the transfer distance of the control signals.

5. The structure of projection light string according to claim 1, wherein the system controller is electrically connected to a photo sensor which is applied to sense the ambient brightness condition around the electronic circuit device and returns the detection results to the system controller, and then the system controller determines whether the surrounding area of the electronic circuit device is currently at daytime or nighttime based on the received detection results.

6. The structure of projection light string according to claim 1, wherein the system controller is electrically connected to a wireless transmitter which is used to receive or transfer the projection time parameter and/or the projection mode parameter via wireless transmissions.

7. The structure of projection light string according to claim 6, wherein the wireless transmitter is a WIFI signal controller.

8. The structure of projection light string according to claim 6, wherein the wireless transmitter is a RF signal controller.

9. The structure of projection light string according to claim 1, wherein the light string power line is further connected to at least an illuminating lamp which is electrically connected to the electronic circuit device and whose ON/OFF status is under the control of the electronic circuit device.

10. The structure of projection light string according to claim 1, wherein the electronic circuit device further includes a status displayer electrically connected to the system controller and used to show the contents represented upon pressing down the function selection button or the time selection button.

* * * * *